W. S. BAKER.
BELT STRETCHER.
APPLICATION FILED JAN. 27, 1916.
1,185,464.
Patented May 30, 1916.
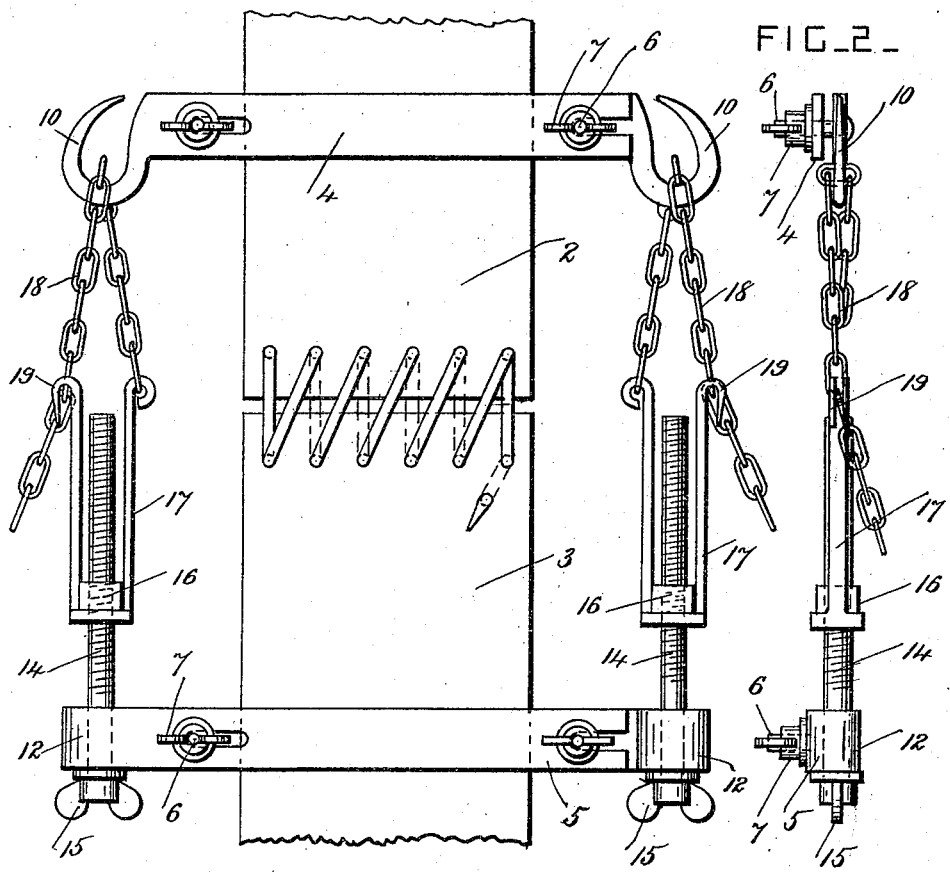

UNITED STATES PATENT OFFICE.

WALTER S. BAKER, OF LAWRENCE, KANSAS.

BELT-STRETCHER.

1,185,464.   Specification of Letters Patent.   Patented May 30, 1916.

Application filed January 27, 1916. Serial No. 74,676.

*To all whom it may concern:*

Be it known that I, WALTER S. BAKER, a citizen of the United States, residing at Lawrence, in the county of Douglas and State of Kansas, have invented certain new and useful Improvements in Belt-Stretchers; and I do hereby declare the following to be a full, clear, and exact description of the invention, such as will enable others skilled in the art to which it appertains to make and use the same.

This invention relates to devices for stretching driving belts and holding their stretched end portions in position while they are being laced together or otherwise connected; and it consists in the novel construction and combination of the parts hereinafter fully described and claimed.

In the drawings, Figure 1 is a plan view of the end portions of a belt and a belt stretcher constructed according to this invention. Fig. 2 is a side view of the same. Fig. 3 is an end view of the forked brackets and one of the clamps, showing the belt in cross-section.

The end portions 2 and 3 of the belt are secured between clamps 4 and 5. These two clamps are each formed of two bars which are drawn toward each other by bolts 6 and thumb-nuts 7.

These bars have longitudinal slots 8 and 9 so that one bar can be disengaged from the other with facility.

The clamp 4 has hook-shaped eyes 10 at its ends, and the clamp 5 has bearings 12 at its ends, but otherwise the two clamps are substantially alike. Stretching screws 14 are journaled in the bearings 12, and are provided with handles or finger pieces 15 for revolving them.

Nuts 16 are arranged to work on the screws 14, and are arranged between the arms of forked brackets 17. The nuts are preferably square, and they are prevented from revolving by the arms which straddle them. A chain or other flexible connection 18 is secured at one end to one arm of each bracket, and is passed through the eye 10 at one end of the clamp 4, and has its other end portion connected to a forked hook 19 formed on the other arm of the same bracket. The free end portions of the two chains 18 are pulled upon by hand to draw the chains through the eyes 10 and pull the end portions of the belt quickly toward each other, so as to take up as much of the slack of the belt as possible. The chains are then hooked into engagement with the hooks 19, and the belt is stretched to the desired tension by turning the screws 14, so that its end portions can be secured together in a satisfactory manner.

The two stretches of the chains 18 permit the forked brackets 17 to have a limited pivotal movement when the screws 14 commence to be revolved, but they prevent the brackets from being revolved by the screws, and they thereby cause the nuts 16 to move longitudinally along the screws when the screws are revolved by hand.

What I claim is:

1. In a belt stretcher, two clamps adapted to be secured to the end portions of the belt, one of the said clamps having eyes at its ends, revoluble stretching screws engaging with the end portions of the other clamp, forked brackets operatively connected with the said screws, and flexible connections for taking up the slack of the belt, each flexible connection being secured to one arm of one of the brackets, and being slidable in one of the said eyes and having its free end portion disengageably connected to the other arm of the said bracket and preventing the said bracket from being revolved by the screw pertaining to it.

2. In a belt stretcher, two clamps adapted to be secured to the end portions of the belt, one of the said clamps having eyes at its ends, revoluble stretching screws journaled in the end portions of the other clamp, forked brackets, rectangular nuts engaging with the said screws and arranged in the forks of the said brackets, and flexible connections for taking up the slack of the belt, each flexible connection being secured to one arm of one of the brackets, and being slidable in one of the said eyes and having its free end portion disengageably connected to the other arm of the said bracket and preventing the said bracket from being revolved by the screw pertaining to it.

In testimony whereof I have affixed my signature.

WALTER S. BAKER.

Copies of this patent may be obtained for five cents each, by addressing the "Commissioner of Patents, Washington, D. C."